UNITED STATES PATENT OFFICE.

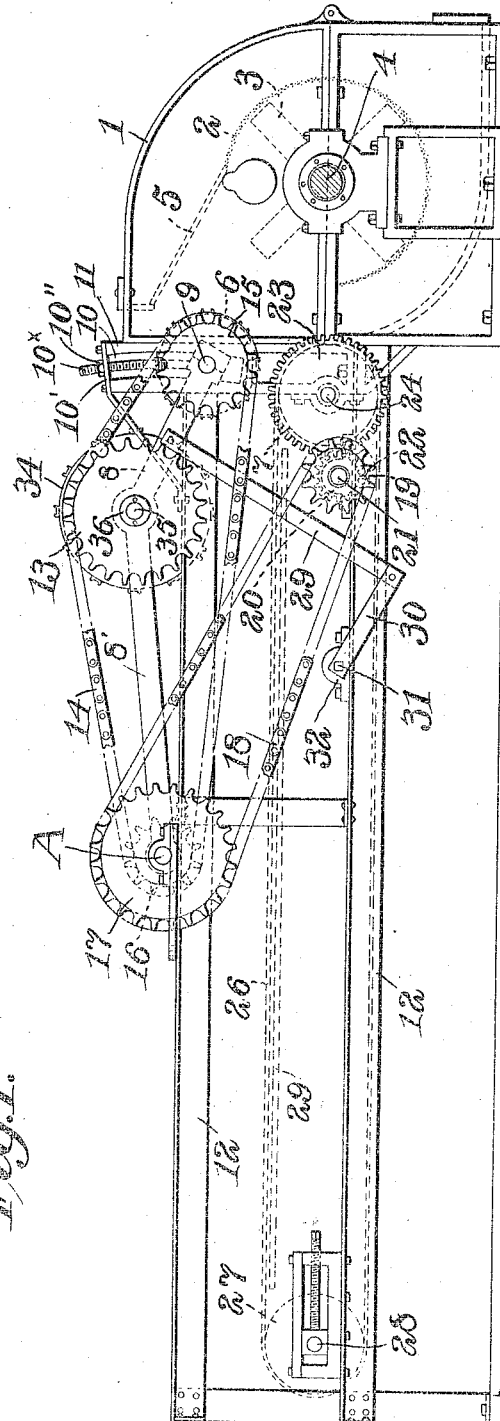

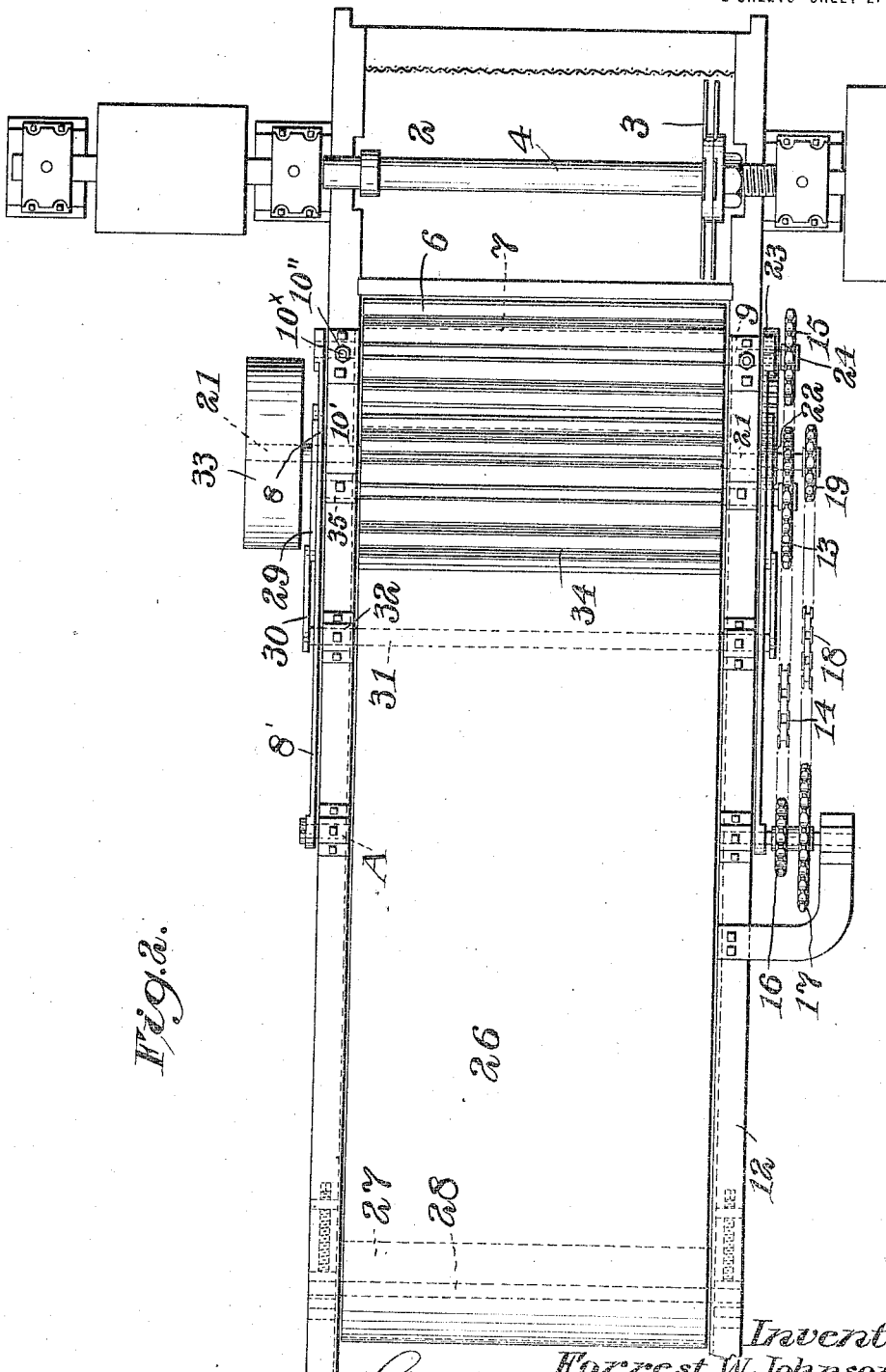

FORREST W. JOHNSON, OF HARTMAN, COLORADO, ASSIGNOR OF ONE-HALF TO FLOYD M. WILSON, OF HARTMAN, COLORADO.

FORCE-FEED ATTACHMENT FOR ALFALFA-GRINDERS AND THE LIKE.

1,305,607.

Specification of Letters Patent.

Patented June 3, 1919.

Application filed May 31, 1917. Serial No. 172,064.

*To all whom it may concern:*

Be it known that I, FORREST W. JOHNSON, a citizen of the United States, and resident of Hartman, Colorado, have invented certain new and useful Improvements in Force-Feed Attachments for Alfalfa-Grinders and the like, of which the following is a specification.

The invention consists in the features and combination and arrangement of parts hereinafter described, and particularly pointed out in the claims.

In the accompanying drawings,

Figure 1 is a side elevation of an apparatus embodying the invention, and

Fig. 2 is a plan view of parts shown in Fig. 1.

In these drawings the grinder casing is shown at 1 within which there is a screen 2, and arms 3 are mounted upon disks carried by a shaft 4, to act upon material fed thereto within the screen and under a baffle plate 5. At the front of the grinder casing 1 the force feed apparatus is located, this consisting of a pair of rolls 6 and 7, the roll 6 being mounted on a shaft 9 carried by arms 8. The shaft extends through guideways 10 formed in standards 11 carried by the main frames 12 of the force feed apparatus, which, as above stated, is located at the open end of the grinder casing. The guideways 10 are struck on a curve from the center A, at which center there are bearings to which are pivotally connected the extensions 8', of the arms 8. The shaft 9 is thus guided in its up and down movement. The side bars 8, 8' have bearings for a shaft 35 on which is fixed sprocket wheel 13 over which a sprocket chain 14 passes, said chain passing around a sprocket wheel 15 on the shaft of the roll 6 and around a sprocket wheel 16 coaxially mounted with the pivoted end of the arm or bar 8, 8', there is a second sprocket wheel 17 coaxially mounted at the pivoted end of the bar 8, 8' and this is driven through a chain 18 from a sprocket wheel 19 mounted in a bearing 20 on the main frame, the shaft of this sprocket being shown at 21 and having a gear 22 thereon meshing with a gear wheel 23 on the shaft 24 of a lower roll 7, said shaft 24 being mounted in a bearing in the main frame. The lower roll receives or carries an endless conveyer belt 26, the forward end of which passes around a directing roll or drum 27 bearing in the frame at 28. This belt moves with its upper stretch above a suitable floor 29 and the material to be ground or operated upon is fed onto this belt and is carried thereby between the upper and lower rolls 6 and 7 into the casing of the grinder. The upper roll can rise and fall to accommodate the passage of the material between the rolls and in this upward and downward movement its bearings are guided in the guideways 10. In order to equalize the action of the roll 6 in rising and falling I provide equalizing arms 29 pivotally connected with the bars or arms 8, 8', the said equalizing arms being connected through levers, one of which is shown at 30 to an equalizing shaft 31 mounted in bearings 32 on the main frame, so that if the roll 6 lifts at one end this motion will be communicated through the arm 29 and lever 30 to the shaft 31, which through similar connections at its opposite end will lift the opposite bar or rod 8, 8' at the other end of the upper roll 6. These rolls 6 and 25 operate at the same surface speed to feed the material into the grinder casing.

The force feed mechanism is self-contained, being mounted upon one frame and is adapted to be positioned in relation to known forms of grinder apparatus.

The power is applied to a pulley 33 on the shaft 21 on which the sprocket 19 is mounted and this power is transmitted to the gearing through the lower roll and through the sprocket chain 18 to the shaft A on which the bars or arms 8, 8' are pivotally mounted and thence to the upper roll by the sprocket chain 14 and sprocket wheels 13 and 15.

On the same shaft 35 with the sprocket wheel 13 a roll 34 is mounted, which runs at nearly the same peripheral speed as the upper roll 6. This roll 6 runs at one revolution per minute faster than roll 34. The roll 34 gives the first compression effect on the material and the faster revolution of the roll 6 just mentioned in respect to the roll 34 keeps the hay or other material from going up between the two rolls 6 and 34. Both of these rolls have channel-iron members or bars riveted thereto, which bars catch or take hold of the material being fed and thus avoiding liability of the rolls slipping on the material. The speed of the feed belt 26 is the same as the peripheral speed of the roll 34. The distance between the roll 34 and the feed belt 26 is greater than the distance between the feed belt and the roll 6 and this may vary. In the example shown the roll 34 is about five inches farther away from the belt than the roll 6. This relative rotation of these rolls in respect to the belt 6 is for the purpose of giving the roll 34 a better chance to take hold of loose hay or other bulky feed and start the compression thereof, so that the material will be under compression when roll 6 engages therewith. Roll 34 is the same length as roll 6 but is about six inches larger in diameter. The upward and downward adjustment of the roll 6 is guided by the guideways 10. This roll 6 is mounted in blocks or bearings adapted to slide in these curved guideways and each of these bearing blocks is connected with a threaded rod $10^x$ of curved form, which passes through the upper stay plate 10'. A nut 10'' on the screw rod rests upon this plate to hold the roll in any position to which it may be adjusted. This nut with its screw-threaded rod is used to regulate the height of the roll 6 and its distance from the roll 7. The weight of the roll is borne by the nut.

No spring is used in any portion of the force feeder as all pressure is derived from the weight of the rolls.

What I claim is:—

1. In combination in a force feed apparatus for grinders, an upper and a lower roll, with means for feeding the material thereto, arms one on each side of the machine supporting the upper roll, said arms being pivotally mounted, an equalizer shaft extending across the machine and a connection between each end of said shaft and the pivotally mounted supporting arms for the upper roll, substantially as described.

2. In combination in a force feed apparatus for grinders, an upper and a lower roll, with means for feeding the material thereto, arms supporting the upper roll and pivotally mounted, an equalizer shaft and connections between the ends of said shaft and the pivotally mounted supporting arms for the upper roll, said connections including levers on the equalizer shaft and links connecting said levers with the pivotally mounted roll supporting arms, substantially as described.

In testimony whereof I affix my signature.

FORREST W. JOHNSON.

Copies of this patent may be obtained for five cents each, by addressing the "Commissioner of Patents, Washington, D. C."